United States Patent [19]

Lukás et al.

[11] Patent Number: 4,950,733
[45] Date of Patent: Aug. 21, 1990

[54] CAPRYLOYLOXYALKYL ACRYLATES, THEIR POLYMERS AND COPOLYMERS AND THE METHOD FOR PREPARATION THEREOF

[75] Inventors: Rudolf Lukáš; Stanislav Ševčík; Věra Palečková, all of Prague; Vladimír Pacovsk, Unhost; Zdenek Mrázek, Prague; Jareslava Nohová, Prague; Olga Prádová, Prague; Miloš Malík, Valacské Meziříčí; Miloslav Kolínsk, Prague, all of Czechoslovakia

[73] Assignee: Ceskoslovenska akademie ved, Prague, Czechoslovakia

[21] Appl. No.: 269,863

[22] Filed: Nov. 9, 1988

[30] Foreign Application Priority Data

Nov. 17, 1987 [CS] Czechoslovakia .................. 8242-87
Dec. 2, 1987 [CS] Czechoslovakia .................. 8776-87

[51] Int. Cl.$^5$ ........................................... C08F 220/18
[52] U.S. Cl. .................................. 526/323.1; 526/327
[58] Field of Search ............................ 526/323.1, 327

[56] References Cited

U.S. PATENT DOCUMENTS 3,575,946 4/1971 Chromecek et al. ............. 526/323.1
4,260,541 4/1981 Kolinsky et al. ..................... 525/27
4,452,996 6/1984 Yokoshima et al. ............. 526/323.1

Primary Examiner—Joseph L. Schofer
Assistant Examiner—Jeffrey T. Smith
Attorney, Agent, or Firm—Leydig, Voit & Mayer

[57] ABSTRACT

The invention pertains to capryloyloxyalkyl acrylates of the general formula

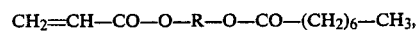

where R is an alkylene group with 2 to 6 carbon atoms, their polymers and copolymers containing structure units of the general formula

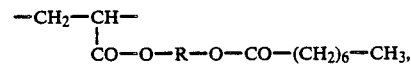

where R is alkylene group or different alkylene groups with 2 to 6 carbon atoms and the polymer contains either 100% of the capryloyloxyalkyl acrylate structure units or additional vinyl chloride structure units in the main chain or side chains.

The invention also pertains to the method for preparation of capryloyloxyalkyl arcylate which consists in the esterification of hydroxyalkyl caprylate of the general formula

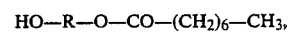

where R has the above given meaning, with acrylic acid, its chloride, bromide or anhydride or of hydroxyalkyl acrylate of the general formula

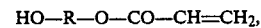

where R has the above given meaning, with caprylic acid, its chloride, bromide or anhydride, whereas the esterification carried out with acid halides are advantageously carried out in the presence of aprotic nitrogen bases, as pyridine, triethylamine, dimethylaniline, or quinoline.

The invention further pertains to the method for producing the polymers and copolymers containing capryloyloxyalkyl acrylate structure units, which consists in the polymerization and copolymerization of capryloyloxyalkyl acrylates or their copolymerization with vinyl chloride in solution or aqueous dispersion at 0° C. to 80° C. up to the conversions of 55 to 94% or in the polymerization of vinyl chloride in the presence of poly(capryloyloxyalkyl acrylate) at 0° C. to 80° C. up to the conversions of 55 to 94%.

The invention is applicable in the production of new types of plasticized PVC with the suppressed migration and extraction of the plasticizing component.

3 Claims, No Drawings

CAPRYLOYLOXYALKYL ACRYLATES, THEIR POLYMERS AND COPOLYMERS AND THE METHOD FOR PREPARATION THEREOF

The invention pertains to capryloyloxyalkyl acrylates, their polymers and copolymers and to the method for their preparation.

Homopolymers and copolymers based on polymers containing ester groups, which serve as plasticizing components or modificators of flow properties for polymers, are the indispensable components of polymeric mixtures. They have a special importance with poly(vinyl chloride), ⅔ of the world production of which is worked to hard articles (flow modifiers and similar additives find the use in this case) and the remaining ⅓ of production is processed to plasticized products. The main part of plasticized PVC is still produced in the classical way, i.e. by means of low-molecular weight compounds which cause the required changes in physical and physicochemical properties of polymers depending on their content in the polymer. However, the systems PVC -low-molecular weight plasticizer are in some cases unsuitable for various reasons, e.g. for hygienic aspects, insufficient service life or loss of parameters of earth-insulation films, roofings, films for agriculture, and others. The most frequent cause of the deteriorated quality of plasticized products and/or their reduced life is the gradual loss of plasticizing components which results in the contraction connected with the formation of mechanical stress in the mass of article. Young modulus of the polymer increases parallelly with the decrease in plasticizer content, causing further increase of stress in the material, worsening of mechanical properties, and an increasing liability to failure. The loss of plasticizers is often accompanied also with the loss of other components, e.g., light stabilizers, the decrease or complete absence of which usually leads to further deterioration of properties and/or to the substantial reduction of life.

The PVC requires high processing temperatures (about 180° C.), particularly in working of hard articles. With respect to a low thermal stability of PVC it is necessary to add stabilizer into mixtures which effectively limits the undesirable decomposition reactions. However, the stabilizers mostly represent a considerable load for environments during liquidation of wastes and increase the cost of processing with respect to their price.

The above mentioned shortcomings of PVC are a worldwide problem and therefore they are the point of interest both of PVC producers and processing industry.

Among the classical types of most often used plasticizers belong phthalates, above all di-(2-ethylhexyl) phthalate (dioctyl phthalate), esters of aliphatic dicarboxylic acids (e.g., dioctyl adipate), and phosphates (namely tricresyl phosphate). The articles plasticized with these compounds exhibit blooming and migration. Investigation of the relationship between chemical structure and migration (Japan Patent No. 58 19,348) revealed that the original types of plasticizers may be modified by enlarging their acid and/or alcohol component (Japan Patent Nos. 58 91,750; 58 129,040; 58 59,945; 59 15,436; 59 22,950; 59 74,144; 58 47,046; 57 03,846; U.S. Pat. Nos. 4,167,504 and 4,327,021). The development of these plasticizers led to the introduction of polymeric plasticizers based on polyesters (Whittington W. H., Plast. Compd. 1984, 32; Japan Patent Nos. 59 98,155; U.S. Pat. No. 4,478,961; Deanin D., Zhong-Bai Z., J. Vinyl Technol. 1984, 18; Bender M. H., Lutz J. T., Jr., J. Vinyl Technol. 1979, 197), polyurethanes (U.S. Pat. Nos. 4,210,730 and 4,212,957; Japan Patent Nos. 59 33,345 and 59 189,157), copolymers of ethylene with vinyl acetate or also with carbon monoxide (Japan Patent Nos. 59 33,345; 58 103,547; 59 68,362; 59 36,153) and on rubbers (Patent application F.R.G. No. 3,331,220). Also the application of mixtures of polymers and/or copolymers, namely block copolymers, proved effective (U.S. Pat. Nos. 4,210,730 and 4,212,957; Japan Patent Nos. 59 68,362 and 59 36,153).

Another trend of development is decreasing of the migration of low-molecular weight plasticizers by addition of oxides, salts, and silicates of various metals either single or in mixtures with waxes (Japan Patent No. 57 76,057). As other additives they may serve multifunctional amides (Japan Patent No. 58 89,636), silicone derivatives (Japan Patent Nos. 59 33,343 and 59 08,744). Also a combination of plasticizers (low-molecular weight and polymeric) (Japan Patent Nos. 60 53,152; 59 33,345; 59 105,045; GB Patent application No. 2,025,431) led to the decreased migration and increased resistance towards extraction of plasticizers by water or organic liquids (GB Patent application No. 2,025,431).

The migration of plasticizers was also reduced by additional crosslinking (Japan Patent Nos. 59 33,344 and 57 164,140), e.g., by the reaction of —OH groups, introduced into PVC by the copolymerization with 2-hydroxypropyl acrylate, with diisocyanate (Japan Patent No. 59 33,344). Special cases of crosslinking are the surface crosslinkings caused by plasma (Japan Patent Nos. 55 13,753 and 55 16,059; GB Patent applications No. 2,027,038 and 2,025,981), sometimes in the presence of a crosslinking agent by UV radiation (Japan Patent No. 54 64,573). The surface may be also provided with a protective layer from another polymer (Japan Patent Nos. 60 143,956; 58 46,961; 59 138,239; 59 74,178; 56 129,233; GB Patent No. 2,137,268).

A special chapter is so called internal plasticization based on the preparation of a copolymer of plasticizing component with vinyl chloride, e.g., the terpolymer containing 50 to 80% vinyl chloride, 3 to 47% alkyl acrylate, and 47 to 7% bis(alkyl) vinyl phosphate is suitable, sometimes with other copolymers, e.g., ethylene—carbon monoxide—vinyl acetate (Japan Patent No. 57 147,538) or polyurethane (U.S. Pat. No. 4,350,792) or chlorinated polyethylene, into blends for roofings, etc. The terpolymer of vinyl chloride with alkyl acrylate and bis(alkyl) vinyl phosphate is also used for the finishing and protection of surfaces in car industry (U.S. Pat. Nos. 4,343,856 and 4,496,628).

Further type of plasticized PVC consists of a copolymer of vinyl chloride, alkyl acrylate, and maleate or fumarate. Also block copolymers composed from the alternating segments of PVC and polyester or polyether attain the desired properties of plasticized PVC without problems caused by migration of low-molecular weight plasticizers (the block copolymers are prepared from PVC terminated with —OH groups, which introduce by the reaction with diisocyanate into PVC the isocyanate groups capable to react with polyester or polyether—U.S. Pat. No. 4,248,979).

Vinyl chloride alone or in the mixture with other comonomers may be grafted onto several homopolymers or copolymers, e.g., polyurethane (Japan Patent No. 59 11,347), copolymer of ethylene with vinyl acetate (Japan Patent Nos. 58 49,154; 58 54,937; 58 57,412; 58 22,066), mixture of polyurethane and an ethylene—vinyl acetate copolymer (Japan Patent Nos. 58 93,712 and 59 93,712), or, on the contrary, other monomer, e.g., acrylate, may be grafted on PVC (U.S. Pat. No. 4,480,076—preparation of flexible polymers). Soft polymers are formed by grafting of polyurethane prepared from adipate and aliphatic diisocyanate with a mixture of vinyl chloride and butyl acrylate or vinylidene chloride.

Also mixtures of graft copolymers, e.g., vinyl chloride grafted onto copolymer of ethylene with vinyl acetate and methyl, amyl, or lauryl acrylate grafted on PVC do not exhibit any migration (Japan Patent No. 57 195,138).

As follows from the given survey of technical solutions of the problem of migration and extraction of plasticizers from plasticized PVC, numerous procedures protected by patents reduce or prevent from the migration and extraction of plasticizers. A disadvantage of these procedures are higher demands for their performance and/or utilization of more expensive raw materials, which are manifested in high prices of the products. For this reason we aimed ourselves in the solution of this problem first to the development of the plasticized type of PVC with the decreased migration of plasticizer. The method for preparation of such material is described in U.S. Pat. No. 4,260,541 and is based on polymerization of vinyl chloride in the presence of polymeric plasticizers, e.g., of polyester type, and a small amount of crosslinking agents, e.g., triallyl isocyanurate, the role of which consists in the formation of a light polymeric network from PVC chains limiting the migration and extraction of polymeric plasticizers.

A principal solution leading to the plasticized type of PVC with completely non-migrating component may be attained, if physical bonds in the system PVC - plasticizing component are replaced with chemical bonds. An advantageous method employs the copolymerization of vinyl chloride with a suitable monomer which has a plasticizing effect in PVC after incorporation into polymeric chains by copolymerization. The suitable comonomer, its synthesis and application in the copolymerization with vinyl chloride are described in this invention.

The present invention pertains to capryloyloxyalkyl acrylates of the general formula I,

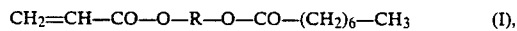

$$CH_2=CH-CO-O-R-O-CO-(CH_2)_6-CH_3 \quad (I),$$

where R is an alkylene group with 2 to 6 carbon atoms, to their homopolymers, mutual copolymers, and copolymers with vinyl chloride, where the synthesized polymers contain capryloyloxyalkyl acrylates in the form of structural units of the general formula II,

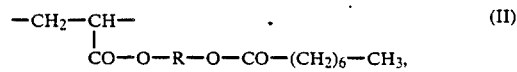

$$\begin{array}{c} -CH_2-CH- \\ | \\ CO-O-R-O-CO-(CH_2)_6-CH_3, \end{array} \quad (II)$$

where R has the same sense as in the formula I.

A method for the preparation of capryloyloxyalkyl acrylates according to the invention consists in treatment of diols of the general formula III,

$$HO-R-OH \quad (III),$$

where R has the above mentioned meaning, first with an agent selected from the group comprising caprylic acid, its chloride, bromide, and anhydride, giving rise to hydroxyalkyl caprylate of the general formula IV,

$$HO-R-O-CO-(CH_2)_6-CH_3 \quad (IV),$$

where R has the same meaning as in the formula I. The compound of general formula IV is then treated with an agent selected from the group comprising acrylic acid, its chloride, bromide, and anhydride, giving the capryloyloxyalkyl acrylate of formula I.

However, the reverse procedure may be also used starting by treatment of a diol with general formula III with acrylic acid or its chloride, bromide, or anhydride giving rise to hydroxyalkyl acrylate of the general formula V,

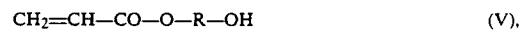

$$CH_2=CH-CO-O-R-OH \quad (V),$$

where R has the above mentioned meaning. The remaining hydroxy group of the compound with formula V is then again esterified with caprylic acid, its chloride, bromide, or anhydride to the desired product of formula I.

Capryloyloxyalkyl acrylates are thus prepared from the corresponding alkandiols according to the invention by twofold esterification, where capryloyl and acryloyl groups are successively introduced into a molecule of diol. Even if the twofold esterification may be carried out by both procedures, the procedure introducing the capryloyl group as the first one followed by acryloylation of the compound with formula IV is more advantageous because the possibility of undesirable spontaneous polymerization during synthesis is smaller. Esterifications of hydroxyl groups in the compounds of formula III, IV and V with the corresponding acyl halides are advantageously carried out in the presence of aprotic nitrogen bases, as are pyridine, triethylamine, quinoline, or dimethylaniline.

The synthesis intermediate hydroxyalkyl caprylate of the general formula IV may be also prepared in such a way that an ester of caprylic acid, e.g., alkyl caprylate of the general formula VI,

$$R'-O-CO-(CH_2)_6-CH_3 \quad (VI),$$

where R' is again an alkyl group with 2 to 6 carbon atoms, or alkylene dicaprylate of the general formula VII,

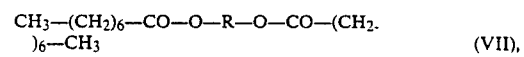

$$CH_3-(CH_2)_6-CO-O-R-O-CO-(CH_2)_6-CH_3 \quad (VII),$$

where R has the formerly said meaning, undergoes the glycolysis in the presence of alkaline alkoxide, e.g., sodium glycolate, as the catalyst.

The intermediate of the general formula IV can be also prepared by the reaction of caprylic acid with corresponding epoxides.

Capryloyloxyalkyl acrylates prepared according to the invention are used for the synthesis of polymeric compounds. The preparation of homopolymers of capryloyloxyalkyl acrylates or their mutual copolymers (i.e. of polymers containing 100% of units of general formula IV, where R is the same or different, or their copolymers with other monomers polymerizable with radicals, e.g., with alkyl acrylates or vinyl chloride, where structure units of vinyl chloride may be in the main chain or side chains, is here concerned. The synthesis of these polymeric compounds is carried out under conditions of radical polymerization and copolymerization, advantageously up to conversions of 55 to 95%, particularly 70 to 90%, at temperatures from 0° C. to 80° C. and pressure corresponding to the temperature, whereas the produced polymers are isolated and processed in the known way.

Molecular mass of the polymers produced according to the invention may be controlled in the known way by the choice of the polymerization procedure of radical (co)polymerization (e.g., solution, emulsion, block, or suspension polymerization) or by using the known regulators of molecular mass, e.g., chlorine or sulfur derivatives as trichloroethylene, tetrachloromethane, n-butylmercaptane, or dodecylmercaptane.

An advantage of the proposed solution consists in the fact, that the plasticized poly(vinyl chloride) prepared according to the invention contains molecules of plasticizers—capryloyloxyalkyl acrylate structure units—incorporated by polymerization, which do not migrate and cannot be extracted due to their chemical bonding. This type of PVC is prepared directly in the polymerization process and does not require, in contradistinction to classical procedures of preparation, mechanical processing of the polymer with plasticizers. The copolymers prepared according to the invention are new types of PVC, which are applicable, e.g., in building industry and agriculture (various kinds of films, namely earth-insulating films with long service life), food industry as packaging materials, or in medicine for materials coming into contact with infusion solutions or body liquids.

The homopolymers of capryloyloxyalkyl acrylates and their mutual copolymers may find use as a substrate in the polymerization process onto these polymers with formation of grafted copolymers.

The invention is further illustrated in the examples of performance, without limiting its scope to these examples by any means.

The polymers in examples are characterized by composition (elemental analysis) and their molecular mass ($\overline{M}_w$) was measured in tetrahydrofuran by the method of light scattering. Extractibility of the plasticizing component from PVC types plasticized with the copolymers of vinyl chloride with capryloyloxyalkyl acrylates was tested by extraction of samples with hexane in a Soxhlet apparatus for 8 hours.

EXAMPLE 1

Synthesis of capryloyloxyethyl acrylate (COEA)

A solution of 2-hydroxyethyl caprylate (HEC) (1 mol; 188.3 g) in pyridine (1.25 mol; 98.9 g; 100.7 ml) was added under continuous stirring at 5°–10° C. into a solution of freshly distilled acryloyl chloride (1.12 mol; 101.4 g) in benzene (300 ml). The mixture was further stirred for 2 hours at the reaction temperature, extracted with 800 ml of 2% hydrochloric acid, the emulsion formed was broken by addition of ether and the aqueous layer was repeatedly extracted with ether until the reaction on capryloyloxyethyl acrylate was negative. The combined ether extracts were washed with water, solution of potassium hydrogencarbonate ($KHCO_3$), and water and dried with magnesium sulfate ($MgSO_4$). Ether was removed by distillation under normal pressure and the product was distilled after addition of octylpyrocatechol as an inhibitor. The overall yield of raw product was 74.9%. The obtained fractions contained 60 to 93% of capryloyloxyethyl acrylate. The product with purity 99.8% was obtained by redistillation; b.p. 111° C./66.7 Pa. Elemental analysis for $C_{13}H_{22}O_4$ theory: 64.44% C, 9.15% H; found 64.23% C; 9.41% H. The infrared and $^{13}C$-NMR spectra proved the expected structure.

EXAMPLE 2

Reaction of sodium caprylate with 2-chloroethanol in 2-ethoxyethanol

Sodium caprylate (2 mol) was prepared by neutralization of caprylic acid (2 mol; 288.4 g; 317.4 ml) in 750 ml xylene with sodium hydroxide (2 mol; 80 g) in water (160 ml). The reaction mixture was freed of water and then heated with chloroethanol (2.1 mol; 170 g; 204.4 ml) with addition of 2-ethoxyethanol (1000 ml) as a solvent under reflux for 28 hours. The precipitated NaCl was filtered off and washed with 2-ethoxyethanol. The filtrate was distilled and 66% of 2-hydroxyethyl caprylate was obtained; b.p. 141° C./266 Pa. Elemental analysis for $C_{10}H_{20}O_3$ theory: 63.79% C, 10.71% H; found: 63.54% C, 10.93% H. The structure was confirmed by infrared and $^{13}C$—NMR spectroscopy. Further procedure was carried out according to example 1.

EXAMPLE 3

Glycolysis of ethylene dicaprylate

Sodium metal (0.01 gatom; 0.23 g) was dissolved in anhydrous ethylene glycol (3 mol; 186 g) and then ethylene dicaprylate (1 mol; 314 g) was added and the reaction mixture was heated for 5 hours under reflux (according to TLC analysis, ethylene dicaprylate disappeared from the reaction mixture already after 2 hours). The yield of 2-hydroxyethyl caprylate was 92%. Further procedure was carried out according to example 1.

EXAMPLE 4

Reaction of ethylene glycol with capryloyl chloride

Capryloyl chloride (0.602 mol; 98 g) was dropwise added during 1.5 hour into a mixture of ethylene glycol (3 mol; 186 g) and pyridine (0.6 mol; 47.4 g). The mixture was further stirred for 2 hours at laboratory temperature, allowed to stand overnight, and threetimes extracted with benzene (100+50+25 ml). The benzene extract was shaken with a 10% aqueous solution of $NaHCO_3$ (2×30 ml) and water and benzene was evaporated in a rotation evaporator. Distillation of the residue gave 4 raw fractions with purity 79.9 to 97.9% at the overall yield of 2-hydroxyethyl caprylate 79.5%. Further procedure was carried out according to example 1.

EXAMPLE 5

Reaction of ethylene glycol with caprylic anhydride

Anhydride of caprylic acid (0.477 mol; 129 g) was dropwise added into boiling dry ethylene glycol (3.16 mol; 196 g) and the mixture was refluxed for further 4 hours. The mixture was cooled, extracted twice with benzene (100+20 ml), benzene was evaporated in a rotation evaporator, and the residue was distilled. 2-Hydroxyethyl caprylate was obtained in the yield of 142.75 g (159% of theory), which is the evidence that almost ⅔ of caprylic acid formed was esterified with glycol under the experimental conditions. The raw fractions had purity 88.9 to 97.5% of 2-hydroxyethyl caprylate. Further procedure was carried out according to example 1.

EXAMPLE 6

Reaction of caprylic acid with ethylene glycol

Three fractions containing 68.6 to 97.8% of 2-hydroxyethyl caprylate were obtained by heating caprylic acid (1.25 mol; 180 g) with ethylene glycol (8.27 mol; 513.5 g) to boiling temperature for 5 hours and gradual distillation; the overall yield of 2-hydroxyethyl caprylate was 61.3%. In addition to 2-hydroxyethyl caprylate, ethylene dicaprylate was formed from 21% of caprylic acid. In a similar experiment, the reaction mixture after 7 hours of heating was first extracted with benzene and the benzene extract with water, instead of direct distillation. Caprylic acid was consumed in 60.6% for 2-hydroxyethyl caprylate, whereas ethylene dicaprylate resulted from 21.5% of acid; distillation gave fractions of raw product containing 97.6 to 98.5% of 2-hydroxyethyl caprylate. Further procedure was carried out according to example 1.

EXAMPLE 7

Acid catalyzed azeotropic esterification of ethylene glycol with caprylic acid and an entrainer lighter than reaction water A mixture of caprylic acid (8 mol; 1153.8 g; 1269.5 ml), ethylene glycol (8 mol; 1003.2 g; 901.3 ml), p-toluenesulfonic acid (0.233 mol; 40 g), and benzene (800 ml) was boiled under a universal azeotropic adaptor for 8.25 hours. The mixture was then cooled, extracted with water, solution of $NaHCO_3$, and again with water. The emulsion was broken by addition of ether. The product with b.p. 124°–127° C./266 Pa was obtained in the yield of 900 g (60%). Further procedure was carried out according to example 1.

EXAMPLE 8

Azeotropic esterification of ethylene glycol with caprylic acid and an entrainer heavier than reaction water A mixture of caprylic acid (8.3 mol; 1200 g), ethylene glycol (54.6 mol; 3423.3 g), and chloroform (1470 g; 1000 ml) was boiled under a universal azeotropic adaptor. After removal of the solvent by distillation, ethylene glycol was distilled off at 2 kPa. The yield of raw product was 1330.4 g (85% of 2-hydroxyethyl caprylate with purity 93%). Further procedure was carried out according to example 1.

EXAMPLE 9

Synthesis of capryloyloxyhexyl acrylate (COHA)

A mixture of caprylic acid (110.5 g; 0.7662 mol) and 1,6-hexandiol (600 g; 5.077 mol) was heated to max. temperature 200° C. for 5 hours, while 25 g of organic volatile compounds and water was removed by distillation. The excess of 1,6-hexandiol was distilled off in vacuum and the residue was cooled and diluted with benzene (750 ml). The benzene solution was extracted with water ($3 \times 250$ ml), the solvent was evaporated, and the product was distilled through a short empty column ($100 \times 25$ mm). 6-Hydroxyhexyl caprylate (HHC) had b.p. 120° C./8 Pa. The main fraction containing 98.6% HHC was obtained in the yield of 157.2 g (84%). Elemental analysis for $C_{14}H_{28}O_3$ theory: 68.81% C; 11.55% H; found: 68.65% C, 11.72% H. Infrared and $^{13}C$—NMR spectra proved the structure of HHC.

Acryloylation of HHC was carried out by the procedure described in example 1. The yield of raw COHA was 77.2%. Redistillation gave the product with purity 99.7% COHA; b.p. 145° C./26.6 Pa Elemental analysis for $C_{17}H_{30}O_4$ theory: 68.42% C, 10.13% H; found: 68.31% C, 10.22% H. The structure of COHA was confirmed by IR and $^{13}C$—NMR spectroscopy.

EXAMPLE 10

Polymerization of vinyl chloride

A 1-$dm^3$ stainless-steel jacketed reactor equipped with a horse-shoe stirrer and breakers was charged with 300 g of vinyl chloride, 550 g of distilled water, 35 g of a 3.8% aqueous solution of hydroxypropyl methyl cellulose, and 0.48 g of dicety peroxydicarbonate. The polymerization was carried out at 52.5° C. and 500 r.p.m. for 6 hours. The polymer obtained was dried at 40° C. in stainless-steel dishes lined with filtration paper to a constant weight. The polymerization gave 225 g of PVC (conversion 75%) with molecular mass $\overline{M}_w = 135,00$.

EXAMPLE 11

A 1-$dm^3$ round-bottom glass flask provided with a reflux condenser was charged with 270 g of benzene, 30 g of capryloyloxyethyl acrylate and 0.3 g of benzoyl peroxide. The polymerization was carried out in argon atmosphere at 80° C. for 10 hours under stirring with a magnetic stirrer. After the polymerization was completed, the polymer was obtained by precipitation into 3 $dm^3$ of methanol. The precipitation solution was decanted and the residues of benzene and methanol were removed from the polymer by evaporation in vacuum of water-jet pump and oil pump. The obtained polymer was twice reprecipitated in a cold system tetrahydrofuran - methanol and dried) the yield was 17.2 g (57.3% of theory) of polymer with molecular mass $\overline{M}_w = 12,500$.

EXAMPLE 12

The polymerization was carried out by the same procedure as in example 11, with the distinction that a half amount of capryloyloxyethyl acrylate was replaced with the same amount of capryloyloxyhexyl acrylate. The polymer was obtained in the yield of 18.3 g (61% of theory) and had molecular mass $\overline{M}_w = 14,000$. The composition corresponded to the concentration of both acrylates in the polymerization batch.

EXAMPLE 13–21

The polymerizations were carried out in the same way as in example 10, with the distinction that a part of vinyl chloride in the polymerization batch was replaced by the same weight amount of capryloyloxyethyl acrylate (COEA) and the copolymerization proceeded either without or with an addition of molecular mass regulator (Table I). Powdery samples (5 g) from examples 15–21 were extracted with hexane in a Soxhlet apparatus for 8 hours without any loss of COEA structure units.

TABLE I

Copolymerization of vinyl chloride with capryloyloxyethyl acrylate (COEA) in an aqueous suspension at 52.5° C.; $[COEA]_o$ and $[COEA]_c$ are the concentrations of COEA in the organic phase of polymerization batch and in copolymer, respectively; $\tau$ is the polymerization time, and $M_w$ molecular mass.

| Example | $[COEA]_o$ (wt. %) | $[COEA]_c$ (wt. %) | $\tau$ (hrs) | Conversion (%) | $\overline{M}_w \times 10^{-3}$ |
|---|---|---|---|---|---|
| 10 | 0.0 | 0.0 | 6 | 75 | 135 |

TABLE I-continued

Copolymerization of vinyl chloride with caproyloxyethyl acrylate (COEA) in an aqueous suspension at 52.5° C.; [COEA]$_o$ and [COEA]$_c$ are the concentrations of COEA in the organic phase of polymerization batch and in copolymer, respectively; $\tau$ is the polymerization time, and $\overline{M}_w$ molecular mass.

| Example | [COEA]$_o$ (wt. %) | [COEA]$_c$ (wt. %) | $\tau$ (hrs) | Conversion (%) | $\overline{M}_w \times 10^{-3}$ |
|---------|--------------------|--------------------|--------------|----------------|--------------------------------|
| 13      | 0.8                | 1.2                | 6            | 77             | 127                            |
| 14      | 10.5               | 12.8               | 6            | 83             | 350                            |
| 15[a]   | 11.3               | 15.1               | 6            | 75             | 130                            |
| 16      | 21.0               | 25.4               | 5            | 83             | 900                            |
| 17[a]   | 21.0               | 28.4               | 5            | 74             | 150                            |
| 18      | 28.0               | 31.7               | 5            | 88             | 1130                           |
| 19      | 28.0               | 42.0               | 3.75         | 67             | 1050                           |
| 20      | 35.0               | 39.0               | 4.50         | 90             | 1010                           |
| 21      | 35.0               | 50.1               | 3.50         | 70             | 1200                           |

[a]Polymerization with addition of 0.03 wt. % of trichloroethylene (related to the total weight of comonomer mixture) as a regulator of molecular mass.

EXAMPLE 22

The polymerization was carried out by the same procedure as in example 10, with the distinction that a part of vinyl chloride in the polymerization batch was replaced by the same weight amount of caproyloxyhexyl acrylate (COHA). The organic phase of polymerization batch contained 21 wt. % of COHA and 0.03 wt.% of trichloroethylene; polymerization time was 5 hours. It was obtained 228 g of copolymer (conversion 76%) which contained 27.6 wt.% of COHA structure units and had $\overline{M}_w$145,000. The powdery sample (5 g) was extracted for 8 hours with hexane in a Soxhlet apparatus and no loss of COHA structure units was observed.

EXAMPLES 23-25

The polymerizations were carried out by the same method as in example 10, with the distinction that a part of vinyl chloride in the polymerization batch was replaced with the same weight amount of poly(capryloyloxyethyl arylate) (PCOEA) prepared according to example 11 or of the copolymer of capryloyloxyethyl acrylate with capryloyloxyhexyl acrylate (PCOEHA) prepared according to example 12 (Table II). During extraction of powdery samples with hexane, the content of acrylate component did not decrease.

TABLE II

Polymerization of vinyl chloride in the presence of poly(capryloyloxyethyl acrylate) (PCOEA) or copolymer of capryloyloxyethyl acrylate with capryloyloxyhexyl acrylate (PCOEHA) in an aqueous suspension at 52.5° C.; [P]$_o$ and [P]$_c$ is the concentration of PCOEA or PCOEHA in the organic phase of polymerization batch and in polymer, respectively; $\tau$ is polymerization time, and $\overline{M}_w$ is molecular mass

| Example | [P]$_o$ (wt. %) | [P]$_c$ (wt. %) | $\tau$ (hrs.) | Conversion (%) | $\overline{M}_w \times 10^{-3}$ |
|---------|-----------------|-----------------|---------------|----------------|--------------------------------|
| 23      | 11.3 (PCOEA)    | 14.0 (PCOEA)    | 4.25          | 81             | 140                            |
| 24      | 21.0 (PCOEA)    | 25.1 (PCOEA)    | 4.25          | 84             | 150                            |
| 25      | 21.0 (PCOEHA)   | 25.3 (PCOEHA)   | 4.25          | 84             | 130                            |

EXAMPLE 26

A 1-dm$^3$ stainless-steel jacketed reactor equipped with a horse-shoe agitator and breakers was charged with 236 g of vinyl chloride, 6.8 g of capryloyloxyethyl acrylate, 550 g of distilled water, 35 g of a 3.8 wt. % aqueous solution of hydroxyethyl propyl methyl cellulose, and 0.48 g of dicetyl peroxydicarbonate. The polymerization mixture was stirred at 500 r.p.m. and, after reached the reaction temperature 52.5° C. (within 5 min), 57.3 g of capryloyloxyethyl acrylate was dosed into the polymerizing system during 4 hours. The total polymerization time was 5 hours and the polymer was isolated and worked by the same method as in example 10. The copolymer was obtained in the yield of 198 g (66% of theory), contained 32.3 wt. % of capryloyloxyethyl acrylate structure units, and had $\overline{M}_w$850,000.

EXAMPLE 27

The polymerization was carried out in the same way as in example 26, with the distinction that 3 g of trichloroethylene was added into polymerization batch and 6 g of trichloroethylene was dosed into the polymerizing system together with capryloyloxyethyl acrylate. The entire amount of added trichloroethylene was 0.03 wt. % related to the total weight of copolymerized monomers. The total polymerization time was 6 hours. The copolymer was obtained in the yield of 201 g (67% of theory), contained 31.9 wt. % of capryloyloxyethyl acrylate structure units, and had $\overline{M}_w$140,000. No loss of capryloyloxyethyl acrylate structure units took place by extraction of 5 g powdery sample with hexane.

We claim:

1. A polymer containing capryloyloxyalkyl acrylate structure units of formula IV,

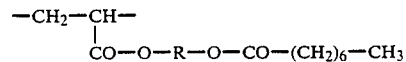

wherein R is an alkylene group with 2 to 6 carbon atoms.

2. A polymer according to claim 1, wherein the said polymer contains 100% of units of the formula IV, and wherein R is the same alkylene group or represents different alkylene groups, each containing 2 to 6 carbon atoms.

3. A polymer according to claim 1, wherein the said polymer contain additional vinyl chloride units either in a main or side chain.

* * * * *